United States Patent [19]

Tanaka et al.

[11] Patent Number: 4,584,345

[45] Date of Patent: Apr. 22, 1986

[54] HEAT-RESISTANT, HIGH-IMPACT RESIN COMPOSITION

[75] Inventors: Kazunobu Tanaka, Himeji; Zenichi Maruo, Sakai, both of Japan

[73] Assignee: Daicel Chemical Industries, Ltd., Sakai, Japan

[21] Appl. No.: 614,915

[22] Filed: May 29, 1984

[30] Foreign Application Priority Data

Jun. 1, 1983 [JP] Japan ................................ 58-97649

[51] Int. Cl.$^4$ ..................... C08L 51/04; C08L 69/00
[52] U.S. Cl. ........................................ 525/67; 525/71
[58] Field of Search .................................. 525/67, 71

[56] References Cited

U.S. PATENT DOCUMENTS

| | | | |
|---|---|---|---|
| 4,351,920 | 9/1982 | Ariga et al. | 525/67 |
| 4,367,310 | 1/1983 | Henton | 525/67 |
| 4,378,449 | 3/1983 | Witman | 525/67 |
| 4,393,169 | 7/1983 | Moriwaki et al. | 525/67 |
| 4,419,491 | 12/1983 | Sakano et al. | 525/67 |
| 4,438,229 | 3/1984 | Fujimori et al. | 525/67 |

FOREIGN PATENT DOCUMENTS

| | | | |
|---|---|---|---|
| 0064692 | 11/1982 | European Pat. Off. | 525/67 |
| 39-71 | 1/1964 | Japan | 525/67 |

*Primary Examiner*—Allan M. Lieberman
*Attorney, Agent, or Firm*—Flynn, Thiel, Boutell & Tanis

[57] ABSTRACT

Heat-resistant, high-impact thermoplastic resin compositions comprising a graft copolymer (A) obtained by graft-copolymerizing an aromatic vinyl compound and an unsaturated carboxylic acid anhydride onto a rubbery polymer; a composite modifier (B) obtained by graft-copolymerizing an aromatic vinyl compound and a methacrylate ester monomer onto a diene rubber polymer; and an aromatic polycarbonate resin (C).

4 Claims, No Drawings

HEAT-RESISTANT, HIGH-IMPACT RESIN COMPOSITION

BACKGROUND OF THE INVENTION

1. Field of the Invention

The present invention relates to a thermoplastic resin composition having improved resistance to heat and impact.

2. Description of the Prior Art

Heretofore, graft compolymers composed of styrene, maleic anhydride and rubbery polymer have been widely used, and it is known that both heat and impact resistances can be improved by combining the graft compolymer with an aromatic polycarbonate (see, Japanese Patent Laid-Open No. 92950/1981).

However, when the content of a rubber-reinforced resin such as ABS resin exceeds that of the aromatic polycarbonate in a resin composition containing the aromatic polycarbonate combined therewith, the dispersibility of the rubber is poor and a composition having satisfactory physical properties in respect of resistance to heat and impact, or the like has not yet been proposed.

We have found that when the graft copolymer composed of an aromatic vinyl compound, an unsaturated dicarboxylic acid anhydride and a rubbery polymer predominates in the composition consisting of said copolymer and the aromatic polycarbonate, there can be obtained a composition in which the rubber component is well-dispersed and which is stable and excellent in heat resistance, but the composition is not considered to be satisfactory with respect of impact resistance.

We have made studies to find a composition which is free from disadvantages associated with the prior art and have found that when a methacrylate ester composite modifier is used as a modifier which is well compatible with the above graft copolymer and capable of imparting sufficient impact resistance, the disadvantages mentioned above can be eliminated. The present invention is based on this finding.

SUMMARY OF THE INVENTION

It is an object of the present invention to provide a thermoplastic resin composition having improved resistance to heat and impact.

In accordance with this invention, there is provided a heat-resistant, high-impact resin composition comprising:

(A) a graft copolymer obtained by graft-copolymerizing 100 parts by weight of a mixture consisting of 95 to 65 parts by weight of an aromatic vinyl compound and 5 to 35 parts by weight of an unsaturated dicarboxylic acid anhydride onto 5 to 50 parts by weight of a rubbery polymer, (B) a composite modifier obtained by graft-copolymerizing 100 parts by weight of a mixture consisting of 20 to 80 parts by weight of an aromatic vinyl compound and 80 to 20 parts by weight of a methacrylate ester monomer onto 10 to 60 parts by weight of a diene rubbery polymer, and (C) an aromatic polycarbonate resin, in such a proportion that 10 to 60% by weight of component (C) is used for 90 to 40% by weight of a mixture consisting of 95 to 50 parts by weight of component (A) and 5 to 50 parts by weight of component (B).

DETAILED DESCRIPTION OF THE PREFERRED EMBODIMENTS

In order to achieve the purpose of the present invention, the above components (A), (B) and (C) are essential constituents of the present invention. The gist of the present invention resides in the use of the methacrylate ester composite modifier as component (B) in order to improve the compatibility of the graft polymer as component (A) with the aromatic polycarbonate as component (C). The solubility parameter of the graft component (A) is about 8.5, that of the modifier component (B) is 8.9 and that of the polycarbonate component (C) is about 9.8 when calculated by Hildebrand's method. Thus, the polarity of the methacrylate modifier component (B) lies between that of the graft component (A) and that of the polycarbonate component (C) and this shows that the component (B) is effective in reinforcing the interface between the component (A) and the component (C) and in inhibiting brittle fracture.

The graft copolymer being used as the component (A) in the present invention is composed of an aromatic vinyl compound, an unsaturated dicarboxylic acid anhydride and a rubbery polymer. The aromatic vinyl compounds useful in the present invention include styrene, o-methylstyrene, m-methylstyrene, p-methylstyrene, α-methylstyrene, p-chlorostyrene, 2,4-dichlorostyrene, and 2,5-dichlorostyrene. Such aromatic vinyl compounds may be used either alone or as a mixture of two or more of them.

Examples of the unsaturated dicarboxylic acid anhydrides include maleic anhydride, itaconic anhydride, citraconic anhydride, mesaconic anhydride, ethylmaleic anhydride, methylitaconic anhydride and chloromaleic anhydride, with maleic anhydride being preferable.

Typical examples of the rubbery polymers include butadiene rubber, butadiene/styrene rubber, butadiene/acrylic rubber, isoprene rubber, isoprene/styrene rubber, isoprene/acrylic rubber, acrylic rubber, styrene/butadiene block rubber, and ethylene/propylene copolymer rubber. As an additional component, vinyl compounds copolymerizable with the above-monomers may be used. Examples of such vinyl compounds include acrylonitrile, methacrylic acid, and methyl methacrylate. In the production of the component (A) of the present invention, it is preferred to use the unsaturated dicarboxylic acid anhydride in a quantity of 5 to 35 parts by weight per 95 to 65 parts by weight of the aromatic vinyl compound. When the quantity of the anhydride exceeds 35 parts by weight, brittle fracture is liable to occur, while when the quantity is less than 5 parts by weight, the heat resistance of the resulting composition becomes extremely poor. The preferred quantity of the rubbery polymer to be used is in the range of 5 to 50 parts by weight per 100 parts by weight of the combined quantity of the aromatic vinyl compound and the unsaturated dicarboxylic acid anhydride. When the quantity of the rubbery polymer is less than 5 parts by weight, impact resistance is poor, while when the quantity exceeds 50 parts by weight, heat resistance becomes poor. Thus, such a quantity is not preferred.

The graft-copolymerized composite modifier being used as the component (B) in the present invention is one obtained by graft-copolymerizing a mixture consisting of the aromatic vinyl compound and the methacrylate ester monomer onto the diene rubber polymer.

Examples of such aromatic vinyl compounds include styrene, o-methylstyrene, m-methylstyrene, p-methylstyrene, α-methylstyrene, p-chlorostyrene, and 2,4-dichlorostyrene. These aromatic vinyl compounds may be used either alone or as a mixture of two or more of them.

Examples of the methacrylate ester monomers include methyl methacrylate, ethyl methacrylate, isopropyl methacrylate, propyl methacrylate, butyl methacrylate, isobutyl methacrylate, t-butyl methacrylate, and benzyl methacrylate. These methacrylate ester monomers may be used either alone or as a mixture of two or more of them.

Examples of the diene rubber polymers include butadiene rubber, butadiene/styrene rubber, butadiene/acrylic rubber, isoprene rubber, isoprene/styrene rubber, and styrene/butadiene block rubber. In the production of the component (B) of the present invention, it is preferred to use the methacrylate ester monomer in a quantity of 80 to 20 parts by weight per 20 to 80 parts by weight of the aromatic vinyl compound. The preferred quantity of the diene rubber polymer is in the range of 10 to 60 parts by weight per 100 parts by weight of the combined quantity of the aromatic vinyl compound and the methacrylate ester monomer. When the quantity of the diene rubber polymer is less than 10 parts by weight, impact resistance is poor, while when the quantity exceeds 60 parts by weight, heat resistance becomes poor. Thus, such a quantity is not preferred.

The methacrylate ester composite modifier as the component (B) can be produced by conventional method.

A particularly preferred modifier used as component (B) in the present invention is a composite modifier which is composed of a diene rubber, an aromatic vinyl compound and a methacrylate ester monomer and has a multi-layer structure wherein there is a rigid layer in the center thereof, a non-rigid layer composed of the diene rubber is formed thereon as the second layer and further a rigid layer is formed thereon as the surface layer. Each layer comprises a polymer substantially bonded to each other, and the rigid layer composed of a homopolymer of the aromatic vinyl compound or the methacrylate ester monomer or a polymer composed of a mixture thereof. As the methacrylate ester composite modifier having such a multi-layer structure, Acryloid KM653 (a product of Rohm & Hass Co., and the like are commercially available and can be effectively used for the purpose of the present invention.

Examples of the aromatic polycarbonate resins used as the component C in the present invention are those obtained, for example, by an ester exchange reaction using 2,2-(4,4'-dihydroxydiphenyl)propane as a dihydroxy component or the reaction of this dihydroxy component with phosgene.

The ratio of the graft copolymer (component A) to the methacrylate ester composite modifier (component B) is preferably in the range of 95 to 50 parts by weight of the component (A) per 5 to 50 parts by weight of the component (B). When the quantity of the component (B) is less than 5 parts by weight, an effect of improving the impact resistance is insufficient, while when the quantity exceeds 50 parts by weight, heat resistance becomes remarkably poor. The aromatic polycarbonate resin as the component (C) is used in a quantity of preferably 10 to 60% by weight per 90 to 40% by weight of a mixture of the components (A) and (B). When the quantity of the component (C) exceeds 60% by weight, it is disadvantageous because of cost, while when the quantity is below 10% by weight, both heat resistance and impact resistance are greatly lowered.

The composition of the present invention can be obtained by blending the graft copolymer (A), the methacrylate ester composite modifier (B) and the aromatic polycarbonate resin (C) in a ratio specified above, and the blending may be conducted by any of powder blending, solution blending, pellet blending and the like in an extruder, kneader or Banbury mixer. If desired, antioxidant, antistatic agent, ultraviolet light absorber, colorant, flame retardant, plasticizer, lubricant, inorganic filler such as glass fiber, and the like may be added to the composition of the present invention.

The thus-obtained composition of the present invention can be molded into a wide variety of useful molded articles, film and sheet in arbitrary means such as by extrusion or injection molding. The compositions of the present invention are excellent in resistance to heat and impact so that they are particularly useful in the manufacture of electrical parts, automobile parts, food containers, medical instruments, business machines and precision apparatuses.

The following examples will further illustrate the present invention, but are not to construed as limiting the present invention in any way.

EXAMPLE 1

38% by weight of pellets of Dylark 350 (maleic anhydride content: about 14 wt. %, polybutadiene content: about 14 wt. %, a product of Arco Polymer), which is a graft polymer (hereinafter referred to as HI-SMA resin) obtained by grafting styrene and maleic anhyride onto a diene rubber, 12% by weight of a powdered resin of Acryloid KM653 (the ratio of methyl methacrylate/butadiene/styrene being 33/48/19 by weight, a product of Rohm & Hass Co.) as the methacrylate ester composite modifier, and 50% by weight of a powdered resin of an aromatic polycarbonate resin (Jupilon S-1000, a product of Mitsubishi Gas Chemical Company, Inc.) (hereinafter referred to as PC resin) were thoroughly mixed together. The mixture was melt-kneaded at 260° C. and extruded by using a 40 m/m extruder (a single-screw extruder) to prepare composite pellets. The pellets were molded into a specimen at 260° C. by an injection molding machine. The Izod impact strength of the specimen was measured according to ASTM D-256 and the heat distortion temperature was measured according to ASTM D-648. The results of the measurements of the physical properties are shown in Table 1. It is apparent from Table 1 that the impact resistance is very high as compared with that of Comparative Example 1, and a modification effect based on the methacrylate ester composite modifier is remarkable.

EXAMPLE 2 AND COMPARATIVE EXAMPLE 1

The procedure of Example 1 was repeated except that the components with the ratio given in Table 1 were used to prepare the compositions and the specimens. Physical tests were conducted. The results are shown in Table 1.

EXAMPLE 3 AND COMPARATIVE EXAMPLE 2

The procedure of Example 1 was repeated except that Dylark 250 (maleic anhydride content: about 6.5 wt. %, polybutadiene content: about 14 wt. %, a product of Arco Polymer) was used as the HI-SMA resin and the components with the ratio given in Table 1 were used. The test results are given in Table 1. It is apparent from Table 1 that when the methacrylate ester composite modifier was blended as an impact modifier in Example 3, the impact resistance is remarkably improved as compared with Comparative Example 2.

EXAMPLE 4

38% by weight of Dylark 350 (a product of Arco Polymer) as the HI-SMA resin, 12% by weight of MBS resin (Kane Ace B-28, a produce of Kanegafuchi Chemical Industry Co., Ltd.) as the methacrylate ester composite modifier and 50% by weight of Jupilon S-1000 as the aromatic polycarbonate resin were thoroughly mixed together. In a similar manner to that of Example 1, a specimen was prepared and its physical properties were measured. It was found that the composition was a composite composition having excellent resistance to heat and impact. The results are shown in Table 1.

TABLE 1

|  | Unit | Ex. 1 | Ex. 2 | Comp. Ex. 1 | Ex. 3 | Comp. Ex. 2 | Ex. 4 |
|---|---|---|---|---|---|---|---|
| HI-SMA resin | wt. % | 38 | 48 | 60 | 48 | 60 | 38 |
| Modifier | wt. % | 12 | 12 | — | 12 | — | 12 |
| Polycarbonate resin | wt. % | 50 | 40 | 40 | 40 | 40 | 50 |
| Izod[1] impact strength | kg.cm/cm | 82 | 54 | 16 | 60 | 21 | 52 |
| Heat[2] distortion temperature | °C. | 112 | 108 | 113 | 105 | 105 | 110 |

[1]Notched ¼ wide test piece
[2]Load = 18.56 kg/cm$^2$, not annealed.

What is claimed is:

1. A synthetic thermoplastic resin composition having high impact and heat resistance, the resin component of which consists essentially of: a blend of
    A. a graft copolymer obtained by graft-copolymerizing
        (1) 100 parts by weight of a mixture consisting of
            (a) from 65 to 95 parts by weight of styrene, substituted styrenes or mixture thereof, and
            (b) from 5 to 35 parts by weight of an unsaturated dicarboxylic acid anhydride onto
        (2) from 5 to 50 parts by weight of a first rubbery polymer obtained by addition polymerization of an ethylenically unsaturated monomer;
    B. a graft copolymer obtained by graft-copolymerizing
        (1) 100 parts by weight of a mixture consisting of
            (a) from 20 to 80 parts by weight of styrene, substituted styrenes, or mixture thereof, and
            (b) from 80 to 20 parts by weight of a methacrylate ester monomer onto
        (2) from 10 to 60 parts by weight of a second rubbery polymer obtained by addition polymerization of a diene, and
    C. an aromatic polycarbonate resin, said blend containing from 10 to 60% by weight of component C and the balance is component A and component B, wherein the weight ratio of component A/component B is from 95/5 to 50/50.

2. A composition as claimed in claim 1 in which component A has a solubility parameter of about 8.5, component B has a solubility parameter of about 8.9 and component C has a solubility parameter of about 9.8, as determined by the Hildebrand method.

3. A composition as claimed in claim 2 in which said substituted styrenes are o-methylstyrene, m-methylstyrene, p-methylstyrene, α-methylstyrene, p-chlorostyrene, 2,4-dichlorostyrene and 2,5-dichlorostyrene; said unsaturated dicarboxylic acid anhydride is maleic anhydride, itaconic anhydride, citraconic anhydride, mesaconic anhydride, ethylmaleic anhydride, methylitaconic anhydride or chloromaleic anhydride; said first rubbery polymer is butadiene rubber, butadiene/styrene rubber, butadiene/acrylic rubber, isoprene rubber, isoprene/styrene rubber, isoprene/acrylic rubber, acrylic rubber, styrene/butadiene block rubber or ethylene/propylene copolymer rubber; said methacrylate ester monomer is methyl methacrylate, ethyl methacrylate, isopropyl methacrylate, propyl methacrylate, butyl methacrylate, isobutyl methacrylate, t-butyl methacrylate or benzyl methacrylate; and said second rubbery polymer is butadiene rubber, butadiene/styrene rubber, butadiene/acrylic rubber, isoprene rubber, isoprene/styrene rubber or styrene/butadiene block rubber.

4. A composition as claimed in claim 1 which contains up to 50% by weight of component C.

* * * * *